March 10, 1942. W. R. GIBSON 2,275,954
WATER TREATMENT PLANT
Filed Jan. 9, 1939 4 Sheets-Sheet 2

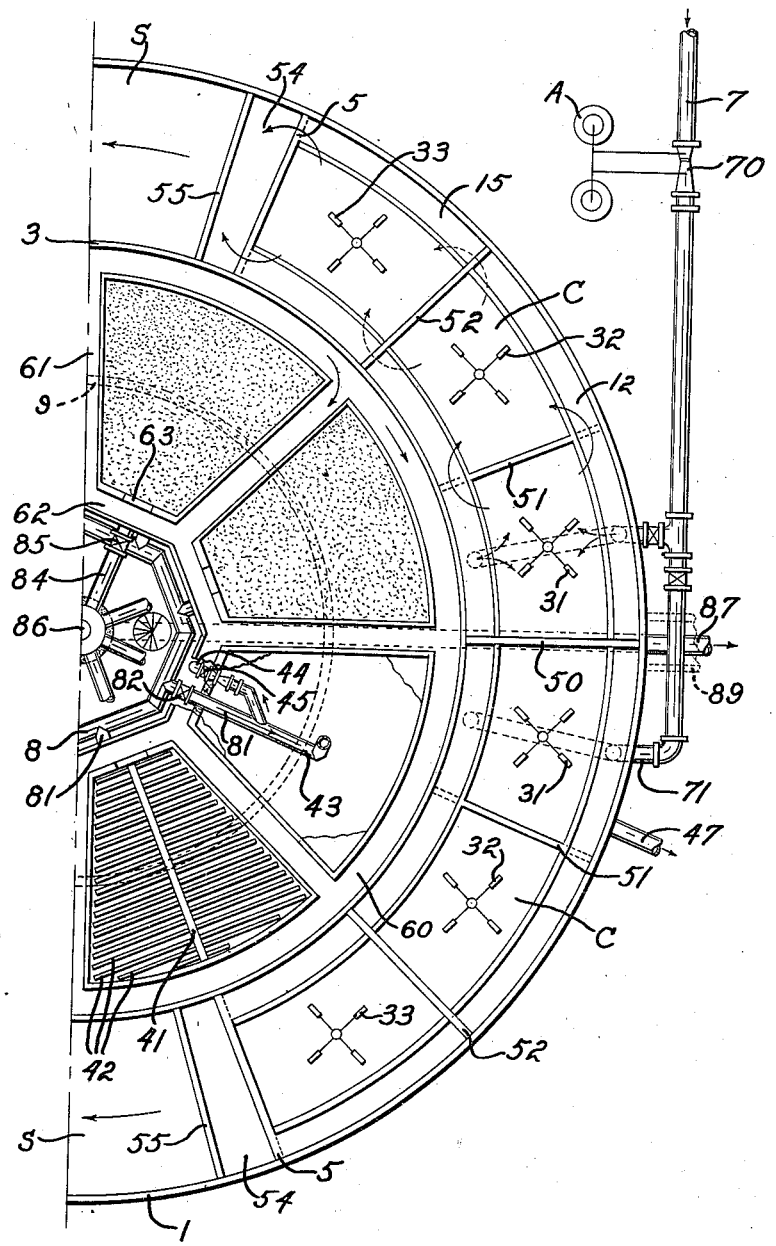

Inventor
William Robert Gibson
By
Charles L. Reynolds
Attorney

March 10, 1942.  W. R. GIBSON  2,275,954
WATER TREATMENT PLANT
Filed Jan. 9, 1939  4 Sheets-Sheet 3

Inventor
William Robert Gibson
By Charles L. Reynolds
Attorney

March 10, 1942.  W. R. GIBSON  2,275,954
WATER TREATMENT PLANT
Filed Jan. 9, 1939  4 Sheets-Sheet 4

Inventor
William Robert Gibson
By Charles L. Reynolds
Attorney

Patented Mar. 10, 1942

2,275,954

UNITED STATES PATENT OFFICE 2,275,954

WATER TREATMENT PLANT

William Robert Gibson, Seattle, Wash.

Application January 9, 1939, Serial No. 249,839

23 Claims. (Cl. 210—12)

The present invention relates to the treatment of water, primarily for the purpose of clarifying raw water to remove sediment therefrom by a filtering process, to the end that the filtered water may be of sufficient purity for industrial uses, such as pulp mills, or for drinking purposes.

Such filtering plants have been known in the art heretofore, consisting usually of a sedimentation basin or a coagulating basin, or both, a filter basin and a clear well or effluent reservoir. Sometimes, because of the nature or characteristics of the particular raw water used, it is necesary to employ preliminary settling basins, but the usual filter plant consists primarily, and in succession, of (1) a coagulating basin, in which, after chemical treatment, the suspended particles are caused to coalesce or coagulate into larger particles which have a better settling value, (2) a sedimentation basin into the bottom of which such coagulated particles are deposited, so that a minimum thereof will pass through to the filter, thereby preventing clogging the filter and preserving its useful life for a greater length of time, and finally (3) a filter basin, whether of the slow sand filter type or of the rapid sand filter type, from whence the filtered water, now freed of its suspended particles, is led to (4) a clear well or filtered water reservoir. Variants of the plant thus described are known, according to the nature and characteristics of the water or the uses to which it is to be put. For instance, chemical treatment is sometimes resorted to to eliminate odors and tastes from the water, or on occasion to soften the water. Again there is sometimes the secondary addition of coagulating agents after the water has passed through the sedimentation basin, in order to insure to a higher degree the coagulation and deposition, at the latest in the filter bed, of the suspended materials. In describing my invention a simple arrangement will be described as typical, but it will be understood that the variants as suggested above, and as known in the art, may be employed without departing from the spirit of my invention.

It is normal practice to build such basins, as for instance the coagulating basin, the sedimentation basin, the filter basin, and the effluent reservoir as more or less separate units, suitably connected by pipes. Sometimes they are joined in line, and pipe vaults are defined between adjoining units for the control of flow between the units. Such separated units are not economical of space, of first cost, nor of operating costs.

Their greatest advantage is their flexibility, for additions may be made from time to time, as required. It has been proposed heretofore (see patent to Morse No. 2,129,181 of September 6, 1938) where flexibility is a minor consideration, to build such plants of generally circular shape, and by thus concentrating the various chambers and the controls, and by making structural elements serve as parts of two or more basins, and mutually strengthening each other, the cost of construction is lessened, space is saved, and operating costs are lessened. Such a circular arrangement is desirable, if flexibility is not a controling factor, and I propose to take full advantage thereof, in this invention, and indeed, this invention aims, by a certain arrangement of the several elements relative to one another, in such a circular plan, to gain the advantages of the general arrangement, yet to eliminate certain disadvantages inherent in former designs, thereby obtaining even greater benefits from the circular, concentric design.

Such prior arrangements, as typified in the Morse patent referred to, while undoubtedly advantageous in many ways, are open to several objections, particularly as related to maintenance and operation, arising from the structure and arrangement adopted. In prior arrangements such as these it has been considered advantageous to be able to control the flow at each one of several stages throughout the system from a centrally located pipe vault, and hence, in principle, at the conclusion of each stage the flow was not permitted to pass directly from one section to another, to enter a succeeding stage, if it were possible to direct it by way of conduits which conduct the flow to and from the central pipe vault, and which have therein control valves. Since this requires, in some instances, flow via conduits from an outer chamber to the central chamber, and then outward again via conduits to another outer chamber or well, the conduits running through or beneath certain intermediate chambers, there resulted a multiplicity of conduits whose sole purpose was leading the liquid inwardly to the pipe vault for control, and then immediately outward again.

Disregarding cost and difficulty of installing such a system, and granting its closeness of control, if that be necessary or desirable (which usually it is not to the extent thus made possible), so long as the the system is operating satisfactorily, the arrangement is definitely undesirable when failure or leakage occurs somewhere, and indeed, by its complication increases the likelihood of failure. Basically, the more and the longer are the conduits, and the greater the number of partitions and chambers traversed, especially by closed conduits not open for inspection and cleaning, as are open channels and weirs, the greater is the likelihood of failure. The chambers traversed being such as can not readily be disturbed without complete interruption of the plant's operation, whenever failure does occur it is a difficult, costly, and time-consuming job to trace the trouble and to make repairs, for each chamber which is merely traversed by a faulty conduit must be torn up, or seriously disturbed. With such conduits buried in the ground beneath the traversed chambers, there was always the further possibility that the entire structure might be so undermined and weakened before discovering or locating such a leak that the entire plant might be endangered.

In the second place, while such plants occupied less ground area than older plants of separate units, hence were used where the available ground area was small, yet they were open to the further objection that they still did not reduce the ground area to the minimum; because of the area and depth, particularly the area, necessary in the filter beds, sedimentation basin and coagulating basin, in a plant of given capacity, the plant must occupy an appreciable ground area, yet it was necessary for it to occupy an even greater ground area because of the location of the clear well as an integral part of and surrounding the water treatment plant per se. It is advantageous to associate the structure of the clear well with the water treatment plant, for it economizes in first cost of the structure, and in operation, yet it loses this advantage where sufficient clear space is difficult to obtain, and where the capacity of the plant is large, let us say 2½ million gallons daily, or 5 million gallons daily, for the additional area required for such a clear well to contain an adequate reserve supply of filter water increases the ground area occupied by the plant to a serious degree. Such considerations restrict the possibility of employing such a plant in many locations, and in locations where compactness, its supposed advantage, is particularly urgent.

A third disadvantage of such plants lay in the coagulation basin, and in the unnecessary and inordinately large ground area required by such coagulation basins, and the greater area thereby entailed of the plant as a whole.

Accordingly it is an object of the present invention to devise a plant of the same general nature, and having like advantages as to compactness, low first cost, and low operating cost, etc., but overcoming to a large degree the disadvantages of the previous types of plant pointed out above, in that, first, there is a minimum of piping connecting the several basins or traversing any given basin, that is to say, a minimum of piping extending beneath the plant as a whole and therefore inaccessible; second, in that the clear well, of whatever capacity may be needed, is incorporated as an integral part of the plant, but is so located that it does not, in any sense, or in any reasonable size or capacity, increase the ground area occupied by the plant over that necessary for the water treatment basins; and third, in that the area of the plant as a whole is kept to the minimum, without reducing its capacity, by better arrangement of the several parts in and of themselves, particularly the coagulation basin, and with relation to each other It is a further object to improve the arrangements for back-washing the filters, for insuring the maximum collection of the filter deposits without appreciable loss of filter sand, and to effect control of the filtering and back-washing from within a central pipe vault, yet with a minimum of pipes traversing the space beneath the filter basin, or other basins.

It is a further object to provide a construction of such plants which admirably adapts itself to erection in concrete, or in a combination of concrete and other materials, as steel or wood.

In general, then, it is an object of the present invention to simplify and lessen the cost of construction of such a filter plant, and to construct such a plant which is the equal to or which exceeds in efficiency previous plants, yet at a lessened first cost, and capable of being operated without increase of cost or at less cost than previous plants of corresponding capacity.

As pointed out above, my invention will be described in conjunction with a simple and representative type of plant, it being understood that variants thereof and additions thereto may be made within the scope of my invention, and as may be required by the particular conditions under which a given plant may be required to operate. My invention therefore comprises the novel plant, and the novel combination and arrangement of the parts thereof, as shown in the accompanying drawings, desscribed in this specification, and as particularly defined by the claims terminating the same, with the above reservations.

In the accompanying drawings I have shown my invention embodied in an illustrative form.

Figure 1 is a half-plan view of one side of the plant as a whole, parts thereof being broken back for better illustration.

Figure 2a is a similar section, on the same line, through Figure 1a.

Figure 3:
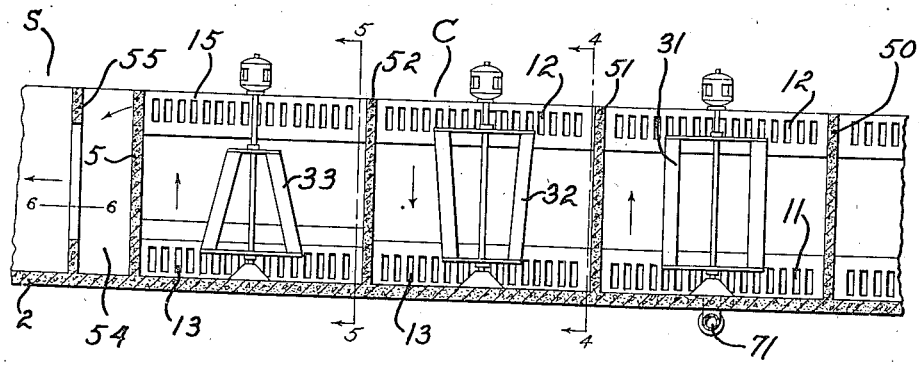
Figure 3 is a developed vertical section taken substantially along the center of the coagulation basin and adjoining parts of the sedimentation basin.
Figure 5:
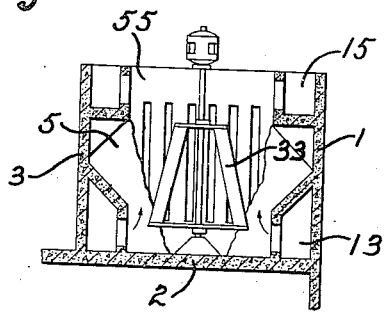
Figure 4:
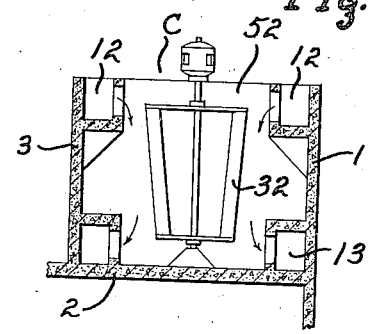

Figures 4 and 5 are cross sections through the coagulation basin, on the respective lines 4—4 and 5—5 of Figure 3.

Figure 6:
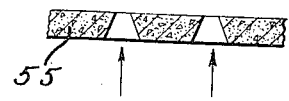

Figure 6 is a section through the equalizing baffle, taken on the line 6—6 of Figure 3.

Figure 1A:
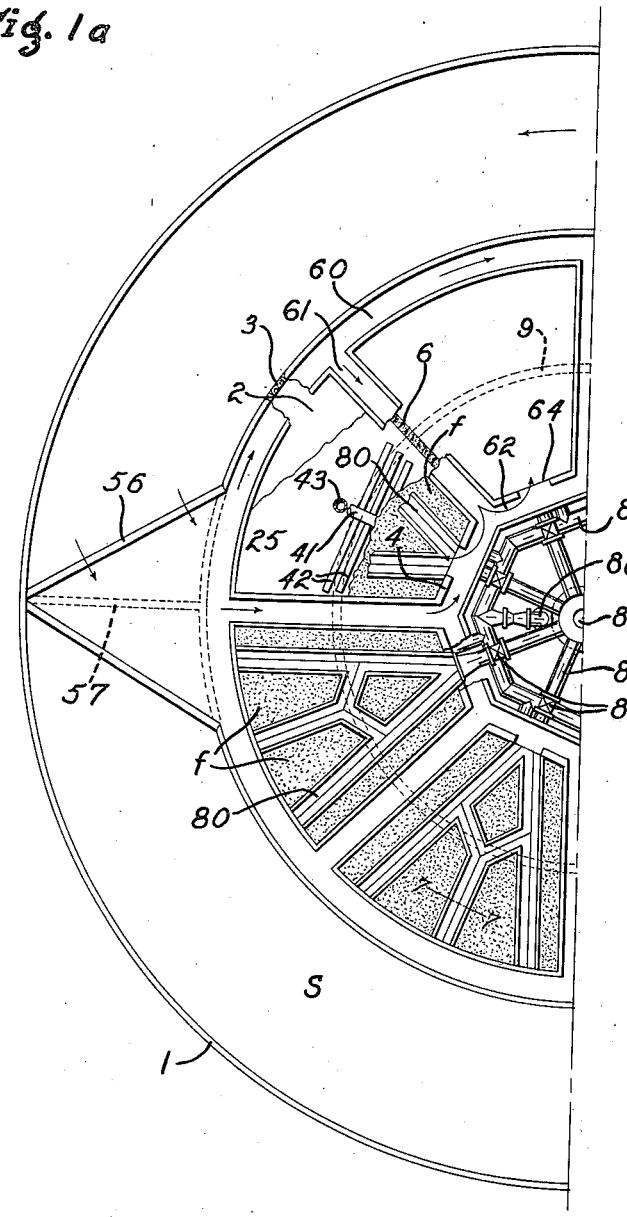
Figure 1a is a half-plan of the opposite side of the same plant, similarly shown.
Figure 2A:
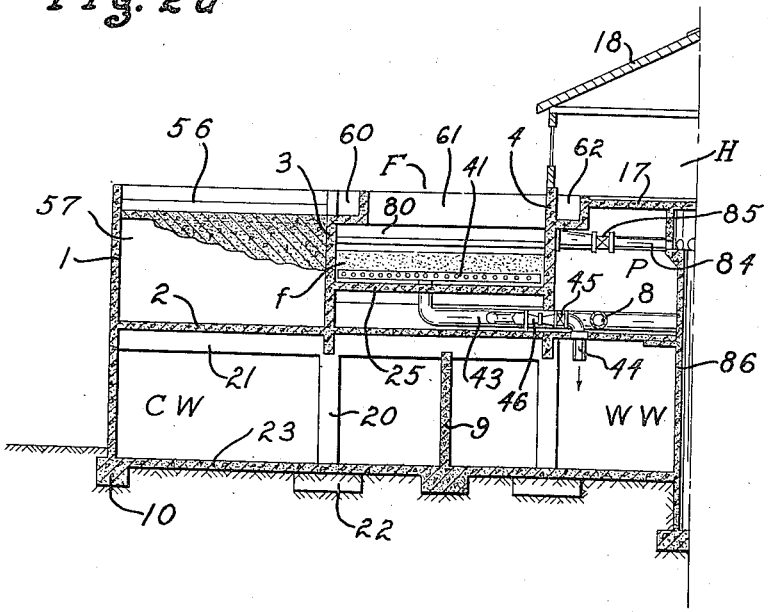
Figure 2:
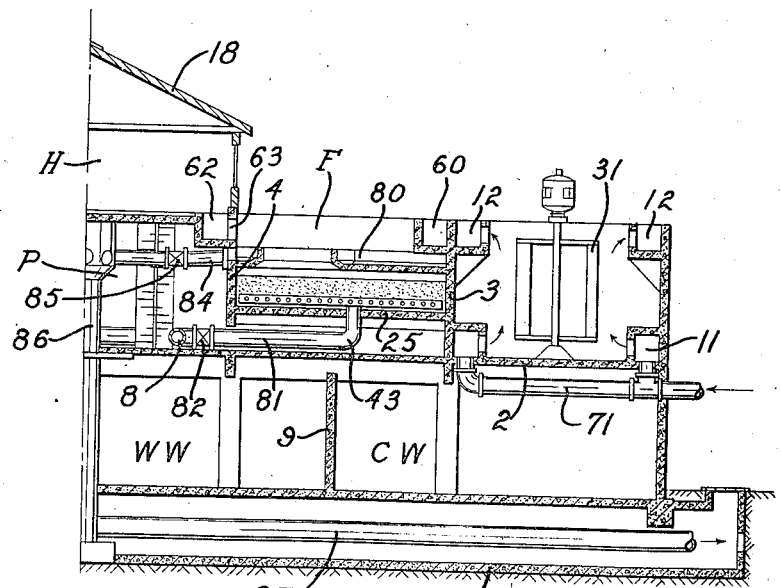
Figure 2 is a transverse vertical section through the half-plant shown in Figure 1, substantially on the line of the drain.
Figure 7:
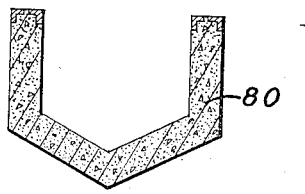

Figure 7 is a detail section substantially on the line 7—7 of Figure 1a, illustrating the drain channels for the filter basin.

Such a water treatment plant may be conveniently and economically constructed of concrete, suitably reinforced, in a generally circular form, and while it is shown as precisely circular, and with chambers concentrically arranged within its outer wall, it is to be remembered that the principles of construction and arrangement may still be embodied in structures which are not precisely circular, or in which the walls are not precisely concentric, for instance in an elliptical form, or in a polygonal or a more nearly rectangular form. It is also to be noted that, while concrete construction is preferred, other suitable materials may be used.

As shown, the structure incorporates an outer wall 1, of circular form, having a proper footing at 10 upon the ground, and rising to the full height of the water treatment basins. The space thus enclosed is preferably divided, however, by a floor or horizontal partition, indicated at 2, intermediate the ground level and the top of the wall 1, and extending entirely across the entire area of the plant. This floor is suitably supported, as by the columns 20 and beams 21, and by the footings 22, and separates the plant into an upper and a lower space having virtually no communication between them. The lower space may be considered as constituting, in its entirety, the clear well, although preferably it is subdivided by the circular wall 9 into a central wash water reservoir WW, which first receives the effluent and is therefore always full, and a surrounding clear well CW, which receives the overflow from the reservoir WW, insuring an ample supply of filtered wash water whenever the same is needed. The water in this reservoir WW may still be employed as a filtered effluent, should the clear well CW run low, provided the filters may still function to refill the reservoir WW after the emergency is past. The reservoir WW need not be circular, nor centrally disposed, though both are preferable, since in this way is avoided any possible necessity for piping connecting chambers and traversing spaces where repairs or inspection might be difficult. The upper space, above the floor 2, is the water treatment plant. The volumes of the upper and lower spaces may be in whatever ratio is necessary to afford ample volume for the processing of the water, and ample volume for the desired amount of storage. In particular it is to be noted that the capacity of the clear well, in a basic plant design, may be increased, within reason, without occupying additional ground area, merely by increasing the height of the floor 2 above ground. The clear well CW and the reservoir WW are normally closed at their bottom by paving 23, resting upon the ground.

The upper space within the outer wall 1 is again divided, preferably by an innermost wall 4 and an intermediate wall 3, to define within the innermost wall 4 a centrally disposed pipe vault P, between the innermost wall 4 and the intermediate wall 3 a filter basin F, and between the intermediate wall 3 and the outer wall 1 an annular space which is further divided by a transverse wall or weir 5 into a coagulating basin C, and a sedimentation basin S. It should be noted here that the filter plant, as is common, is in effect in duplicate. Thus there are two coagulating basins separated by the wall 50, and two sedimentation basins separated by the wall 57, and the filter basin is divided by generally radial walls 6 (see Figure 1a), extending between the walls 3 and 4, into a plurality of separate filter beds. By such arrangements, as is common, one half of the plant may continue operations while the other half of the plant is being cleaned, or any individual filter bed may be washed and cleaned without interrupting the normal operation of the remaining filter beds. The present plant is shown and designed as a rapid sand filter, and such filters must be washed and cleaned frequently in order to maintain their efficiency, hence the division of the filter basin into a number of separate beds or chambers.

The raw water is admitted by a pipe 7 through a metering or flow control device 70, and at this or some other convenient point a coagulating chemical or other chemicals are added to the water from the devices diagrammatically indicated at A. This point should be fairly close to the point where the influent is discharged within the treating plant, and yet flow through some length of pipe tends to effect better mixing of the chemical with the raw water. The pipe 70 is branched, suitable valves being provided to control the flow through one or the other or both such branches, and is delivered through such a branch 71 into the coagulating basin C.

Two considerations must be kept in mind in the form and arrangement of the coagulating basin—one, that there must be sufficient turbulence or mixing of the water, bearing the flocculating chemical, that the suspended particles are brought into intimate association with the chemicals, and begin to grow by coalescing with other particles, which implies some sort of eddy-producing device or arrangement; and two, that the violence of the agitation, particularly towards the discharge end, must not be such as to break up the growing or coalescing floc, nor that the rate of flow at discharge be so great as to sweep along the coagulated materials, instead of depositing them soon after they enter the sedimentation basin. The latter consideration implies a gradual and uniformly progressive slowing down of the rate of flow and of the violence of the agitating devices. This in turn implies adequate flow control arrangements along a path of appreciable length, but to provide a lengthy coagulating basin would defeat certain of the prime objects of the invention, namely, compactness and low cost. However, by controlling the flow through the coagulating basin in such manner that it is mainly vertical, at a low rate, and by providing properly arranged and controlled mechanical flocculators, suited for use with vertical flow, these prime objects may still be attained. The path of flow may be sufficiently lengthy, while the basin itself is of minimum length in plan.

To such ends the coagulating basin is divided into a plurality of flocculating chambers, by transverse walls such as 51 and 52, and water is admitted to alternate chambers at the bottom and discharged at the top, thence entering the intervening chambers at the top for discharge at the bottom. For instance, the influent pipe 71 is branched to admit raw water to sumps 11, extending lengthwise along opposite bottom corners of the first or rapid mix chamber. These sumps 11 are vertically slotted along their inner sides, whereby the inflow is made more smooth and uniform throughout the length of the chamber, and the inflowing water tends to rise vertically. By means of a series of upright paddles rotating within this chamber upon a vertical axis, constituting a mechanical rotary coagulator 31, the inflowing and upflowing water is caused to be rolled and to be mixed with the added chemical.

Channels 12 extend lengthwise the opposite upper corners of the first chamber, and through the wall 51 into and along the upper corners of the second flocculating chamber. These channels, directly above the sumps 11 in the first chamber, are similarly slotted to accomplish a like rate of flow from all parts of the first chamber. The channels 12 are similarly slotted for uniform outflow into the second chamber. Outflow sumps 13, similarly slotted, lying along the opposite lower corners of the second chamber, control flow through the second chamber, keeping its direction generally vertical and uniform throughout the chamber, slowing it down, and finally leading the outflow through the wall 52 and through slots into the third or slow flocculating chamber. A second mechanical flocculator 32, similar to the flocculator 31, meanwhile accomplishes further admixture of water and chemicals, and growth of coagulating particles. The rate of flow is less rapid in this second chamber than in the first chamber, and is progressively decreased, and the inclination of the paddles of the flocculator 32 reduces the peripheral speed of its rotation, hence its rate of impact, progressively in the direction of flow.

The water and the growing floc carried thereby enters the bottom of the third flocculating chamber from the sumps 13, through vertical slots in the inner sides of these sumps, flowing generally upwardly at a slow rate (perhaps 3 feet a minute). It is assisted and directed in its flow, and further mixed, by the mechanical flocculator 33, like the others but with the direction of its paddles reversed as compared to the preceding flocculator 32, since the direction of water flow is now reversed, and with the angle of the paddles further altered to slow down the rate of impact in accordance with the decreasing rate of flow of the water in this chamber. The water rises in this third chamber until it enters the slotted channels 15, which may be used or not, but which, if used, insure vertical flow in this chamber. From these channels 15, or directly over the weir 5 if they are not used, the water may spill, the wall or weir 5 separating the coagulating basin C from the sedimentation basin S, and being only of sufficient height, if the channels 15 are omitted, that the water may spill over it.

Additional flocculating chambers might be used, arranged in the manner indicated, if necessary, and the rate of rotation of the mechanical flocculators may be progressively less, or otherwise suitably controlled, as necessary to attain the desired ends, expressed above. Separate variable speed motors have been shown for driving the individual flocculators 31, 32, and 33, but a common drive means, with suitable provision for varying the rotational rate of each flocculator, might instead be employed.

The water rising over the wall 5 flows lengthwise of the sedimentation basin, the flow being so smooth, so uniform across the width of the basin, and sufficiently prolonged that the floc settles out, and deposits on the bottom of the basin S. To smooth out the flow and to make it uniform across the width of the sedimentation basin a stilling baffle 55, vertically slotted and with slots spaced transversely of the sedimentation basin, is provided, as shown in detail in Figures 5 and 6. In this manner a stilling chamber 54 is provided between the weir 5 and the stilling baffle 55, constituting in effect a separation between the coagulation basin and the sedimentation basin.

At the opposite end of the sedimentation basin the water is skimmed off the top, and at an uniform rate across the entire width, by means of a weir 56, and enters a circular channel or flume 60, carried at the top of the intermediate wall 3. This flume 60 is provided with inwardly directed branches 61, carried upon the dividing walls 6, which finally lead to an inner circular (or polygonal) flume 62, admitting through the passages 64 in the wall 4 into the top of the filter chambers. Gates 63, as shown in Figure 1, are controllable to admit the water or to prevent its admission into any given filter chamber. These gates are conveniently operable from a floor 17 above the pipe vault P, usually closed by a roof 18, defining the control house H.

The construction of the filters per se may be any that is found suitable. The filtration is from the top downwardly, and any convenient means may be employed at the time of filling to accomplish the distribution of the water with reasonable degree of evenness over the entire surface of the filter, which means, as herein shown, comprise channels 80, which, however, have further functions as will appear hereafter. These channels are distributed over the surface of the filter beds, but below the normal level of the water over the filter beds.

The filtering material, as herein shown, is sand, gravel, or a combination thereof, as illustrated at f. It rests upon a false floor 25, supported between the walls 3 and 4, and at the bottom of each filter chamber is disposed the filter under-drain system of any suitable type, such as the header 41 and perforated laterals 42, all leading to the effluent pipe 43, which passes through the false floor 25 into the space between this false floor and the floor 2, and which terminates in a downward extension 44 through the floor 2 and into the clear well CW, or, more strictly speaking, into the wash water reservoir WW which forms part of the clear well.

Preferably, although not essentially, the effluent pipe 43 extends into and through the pipe vault P before extending downwardly at 44 into the reservoir, for in this manner there can be arranged in or adjacent the pipe vault control valves 45 and metering devices 46, to control or govern flow from any given filter chamber to the clear well. It is to be noted, at this point, that no part of the flow, after the influent leaves the influent pipe branches 71, is through pipes or closed conduits of any nature. The channels and sumps 11, 12, 13, and 15 are flow controlling means, rather than closed conduits, and if leakage occurs therein no particular harm results, for they are wholly within the coagulating basin itself. Instead, the liquid is led by open chambers, over weirs, and by way of flumes, all of which are immediately accessible and readily cleaned, from the exterior wall 1 to the flume 62 at the very center of the plant, where it is subject to its first control at the gates 63. None of the flow has traversed another chamber in passing from one section of the plant to another; while the branch flumes 61 appear to traverse the filter section, actually they extend along the top of the partitions 6 which separate the individual filter beds; moreover, they are freely open for cleaning and inspection, as closed or buried pipes can not possibly be; and if any leak should develop in a flume 61, the only effect would be to admit the liquid a little quicker to the filter bed. From the influent pipe to and through the filters there are no closed channels, no traversing of sections by conduits in which leakage would disrupt proper operation of the plant, and to repair which would entail serious tie-up and expense; nevertheless, adequate control conveniently to the central control house H is afforded, and facility for cleaning is improved. From the influent pipe branches 71 to the effluent pipe 43, there are no pipes which appreciably extend beneath any chamber, or which traverse any chamber other than the particular chamber to which they are connected. Moreover, by reason of the fact that the water treatment plant is elevated above the clear well or reservoir, such pipes as do extend beneath certain chambers or basins, which are only the effluent pipe 43 and the influent branches 71, may still be reached for inspection, repair or replacement, if necessary, and without tearing down any construction, or tunneling through the earth beneath the structure.

It is believed that the operation of the plant as thus far described is clear. Briefly, water treated at the point A is admitted through the influent pipe 71 into the coagulation basin C, where it passes through the several flocculating chambers; here its mixing is continued and its velocity is slowed down, and it eventually passes from the top of the coagulation basin into the sedimentation basin S, passing from the latter over the weir 56, and thence by way of the flumes 60, 61, and 62 entering the filter basin and the several chambers thereof, passing through the filter beds $f$ to the filter under-drain system, and out the effluent pipe 43, to the wash water reservoir WW directly beneath, and thence over the wall 9 to the clear well CW.

As has been pointed out above, it is necessary frequently to back-wash the filter beds $f$. This is conveniently accomplished by admitting wash water under pressure to the filter under-drain system, and by providing means above the filter beds $f$ to drain and carry away the wash water and the material washed out of the filter beds thereby. The wash water is preferably filtered water, and is drawn initially from the clear well, or from the wash water reservoir WW, which is automatically kept adequately filled. It may be drawn directly therefrom and pumped into the wash water system by pumping means, indicated at 88, in the pipe vault P, or it may be pumped to an elevated tank (not shown) for use as needed, and led from this tank (which might be conveniently above the control house 18) into the wash water system. In either event the control of the wash water, as are the other flow controls, is within the pipe vault P, and the source of wash water supply may be considered as the wash water ring 8, within the pipe vault, and connected by a branch 81 to the effluent pipe 43, a valve 82 being provided for admitting the wash water supply to each individual filter chamber after the effluent pipe 43 has been closed at the valve 45.

The individual filter chamber which is to be cleaned having been closed to the entrance of further water to be filtered by closing its gate 63, wash water is admitted to the filter under-drain system 41, 42 of this filter from the wash water ring 8, and flows upwardly under pressure through the filter bed $f$ until it rises over the level of the drain channels 80, previously referred to, which are V-shaped at their bottom and high enough that the expanding filter sand will not rise over its edge. Flowing along these drains, this wash water, laden with material previously deposited in the filter, passes by way of pipes 84 and past a valve 85 to a vertical drain 86 within the pipe vault, whence it passes through (but segregated from) the wash water reservoir WW and thence out to a discharge point by way of the main drain 87.

It may be pointed out here that the drain 86 and the effluent pipe terminals 44 are the only communications through the floor 2, and the drain 87 is the only pipe which traverses the several basins or which lies underground beneath any basin, and this, if desired, may be formed as or enclosed within a duct or tunnel 89, whereby it may be more accessible. The final filtered water draw-off pipe 47 extends from the perimeter of the outer wall 1.

In order to clean the coagulation basin and the sedimentation basin the influent is directed into one only of the coagulation basins, the other being closed off and cleared, and water will continue to flow through the other coagulation basin and its connected sedimentation basin. It will flow over the weir 56, but since each of the weirs 56 is of equal height, and the capacity of the plant beyond this weir 56 is more than sufficient to take away the water without building up the level in the channel 60 to the level in the sedimentation basin S, the water will not flow over the other weir 56, and consequently the closed half of the plant may be cleaned without interruption of the operation of the plant. If desired, however, a gate may be provided for positively preventing back flow over the weir 56 of the closed half of the system. It may be pointed out, too, that drains for the sedimentation basin and for the coagulation basin may discharge directly through the outer wall 1 (again avoiding traversing of any section), therefore avoiding any possibility of contamination of the water in the clear well immediately beneath.

What I claim as my invention is:

1. A liquid clarification plant comprising, in combination, coagulating, sedimentation and filter basins arranged in circular plan, with the coagulating basin at the periphery and the filter basins surrounded by the other basins, filters in the filter basins, a clear well underlying the several preceding basins, means to conduct raw water directly from the exterior into the peripherally disposed coagulating basin, means to conduct the water successively from the coagulating basin to the sedimentation basin and thence to the filter basin, without in any instance traversing any other of said basins, nor the clear well, effluent pipes leading from each filter basin downwardly to the clear well, and a filtered water draw-off pipe leading from the clear well.

2. A liquid treatment plant comprising, in combination, coagulating, sedimentation, and filter basins, and a pipe vault, arranged in circular plan, with the coagulating basin at the periphery, the filter basins surrounded by the other basins, and the pipe vault centrally disposed, filters in the filter basins, means to conduct raw water directly from the exterior to said peripherally disposed coagulating basin, means to conduct water from the surface of the coagulating basin to the sedimentation basin, and from the surface of the sedimentation basin to the filter basins, in each instance without traversing other basins nor entering the pipe vault, effluent pipes leading from the filter basins, and means in the pipe vault to govern flow through said effluent pipes.

3. A liquid treatment plant comprising, in combination, coagulating, sedimentation, and filter basins, and a pipe vault, arranged in circular plan, with the coagulating basin at the periphery, the filter basins surrounded by the other basins, and the pipe vault centrally disposed, filters in the filter basins, means to conduct raw water directly from the exterior to said peripherally disposed coagulating basin, means to conduct water from the surface of the coagulating basin to the sedimentation basin, and from the surface of the sedimentation basin to the filter basins, in each instance without traversing other basins nor entering the pipe vault, effluent pipes leading from the filter basins, means in the pipe vault to govern flow through said effluent pipes, and means within the pipe vault to conduct wash water to the filter basins without traversing other basins.

4. A liquid treatment plant comprising, in combination, an outer wall defining an enclosure, a partition dividing the enclosure into separate upper and lower water-containing spaces, an inner wall spaced inward from the outer wall, within the upper space, defining within itself a filter basin, and between itself and the outer wall preliminary liquid treatment basins, flow governing means to conduct water from said preliminary basins to the filter basin, filtering means in the filter basin, effluent discharging means leading from the filter basin to the lower space, means for the withdrawal of filtered water from such lower space, and means to deliver raw water to the preliminary treatment basins.

5. The combination of claim 4, including a wall dividing the lower space into a wash water reservoir, where into the effluent discharging means discharges, and a residual clear well, into which the reservoir overflows.

6. A liquid treatment plant comprising, in combination, an outer wall defining an enclosure, a partition dividing the enclosure into separate upper and lower water-containing spaces, each substantially coextensive with the enclosure, an inner wall spaced inward from the outer wall, within the upper space, defining within itself a central pipe vault, a wall intermediate the inner wall and the outer wall, defining between itself and the inner wall an annular filter basin, and defining between itself and the outer wall preliminary liquid treatment basins, means to deliver raw water to one of said preliminary treatment basins, means in such basin for the preliminary treatment of the water, means governing flow from such basin to the filter basin, filtering means in the filter basin, means controllable from within the pipe vault to permit and regulate flow from the filter basin downwardly through said partition into the lower space, and a filtered water draw-off pipe tapping the lower space.

7. A liquid treatment plant comprising, in combination, an outer wall defining an enclosure, a partition dividing the enclosure into separate upper and lower water-containing spaces, each substantially coextensive with the enclosure, an inner wall spaced inward from the outer wall, within the upper space, defining within itself a central pipe vault, free of water, a wall intermediate the inner wall and the outer wall, defining between itself and the inner wall an annular filter basin, and defining between itself and the outer wall preliminary liquid treatment basins, means to deliver raw water to one of said preliminary treatment basins, means in such basin for the preliminary treatment of the water, means governing flow from such basin into the filter basin, filtering means in the filter basin, means controllable from within the pipe vault to permit and regulate flow from the filter basin downwardly through said partition into the lower space, a filtered water draw-off pipe tapping the lower space, a wash water supply means connected to the filter basin, means within the pipe vault controlling discharge of wash water through the filtering means, and a wash water drain leading from the filter basin back to the pipe vault, and thence exteriorly of the enclosure.

8. A liquid treatment plant comprising, in combination, an outer wall defining an enclosure, a floor dividing the enclosure into a lower clear well and an upper treatment space, interior walls dividing the upper space into a central pipe vault, a filter basin next outwardly of and surrounding the pipe vault, and two or more preliminary liquid treatment basins outwardly of and surrounding the filter basin, filtering means in the filter basin, means to deliver raw water to a first preliminary treatment basin, means in each preliminary treatment basin for the preliminary treatment of the water, means to govern flow of the water from such first preliminary treatment basin in turn through a succeeding preliminary treatment basin or basins, the filter basin, and to the clear well, said flow-governing means including means to deliver the water to the top of the filter basin and to discharge the filtered effluent downward from the filter basin through said floor and directly into the clear well, a wash water supply means within the pipe vault connected for discharge into the bottom of the filter basin, wash water drain channels in the filter basin, above the level of the filtering means, but below the normal water level therein, a wash water drain in the pipe vault into which said channels discharge, and means in the pipe vault to control flow of effluent from the filter basin to the clear well, and the discharge of wash water from said supply means into the filter basin.

9. A liquid treatment plant comprising, in combination, an outer wall defining an enclosure, interior walls dividing such enclosure into a central pipe vault, an annular filter basin next outwardly of and surrounding the pipe vault, and an annular outer space surrounding the filter basin, generally radially disposed walls dividing the outer space into a coagulating basin and a sedimentation basin, means to deliver raw water to the coagulating basin, means to govern flow of the water from the coagulating basin to the sedimentation basin, and from the top of the latter basin to the top of the filter basin, effluent conduit means leading from the bottom of the filter basin, and means within the pipe vault to govern flow through the effluent conduit means.

10. A liquid treatment plant comprising, in combination, an outer wall defining an enclosure, a wall spaced inwardly thereof and defining within it a filter basin, and defining between itself and the outer wall an annular space, walls extending transversely of such annular space to define a coagulating basin and a sedimentation basin, means to deliver raw water to the coagulating basin, means to regulate flow circularly from the coagulating basin to the sedimentation basin, and thence inwardly to the filter basin, and effluent conduit means leading from the filter basin.

11. A liquid treatment plant comprising, in combination, an outer wall defining an enclosure, a horizontal partition dividing the enclosure into an upper water treatment space and a lower treated water storage space, each substantially coextensive with the enclosure, a wall within the upper space spaced inwardly from the outer wall, and defining within itself a filter basin, and defining between itself and the outer wall an annular space, weirs extending transversely of such annular space to define a coagulating basin and a sedimentation basin, means to deliver raw water to the coagulating basin, for flow generally circularly from the coagulating basin to the sedimentation basin, and thence inwardly to the filter basin, effluent discharge means leading from the filter basin downwardly through the horizontal partition into the lower space, and clear water draw-off means extending through the outer wall from the lower space.

12. A liquid treatment plant comprising, in combination, an outer wall defining an enclosure, a horizontal partition dividing the enclosure into an upper water treatment space and a lower treated water storage space, a wall within the upper space spaced inwardly from the outer wall, and defining within itself a filter basin, and defining between itself and the outer wall an annular space, weirs extending transversely of such annular space to define a coagulating basin and a sedimentation basin, means to deliver raw water to the coagulating basin, for flow generally circularly from the coagulating basin to the sedimentation basin, and thence inwardly to the filter basin, effluent discharge means leading from the filter basin downwardly through the horizontal partition into the lower space, a weir dividing the lower space into two reservoirs, into the first of which the clear water discharge means discharges, and a normal effluent draw-off means extending through the outer wall from the second reservoir.

13. A liquid treatment plant comprising, in combination, an outer wall defining an enclosure, an interior wall spaced inwardly thereof and defining within it a filter basin, and defining between itself and the outer wall an annular space, walls extending transversely of such annular space to divide it into a coagulating basin and a sedimentation basin, means to deliver raw water to the coagulating basin, means to regulate flow circularly from the coagulating basin to the sedimentation basin, a weir governing discharge from the sedimentation basin, a flume carried upon the top of the interior wall, and communicating flumes leading inwardly therefrom and discharging at their inner ends within the top of the filter basin, filtering means in the filter basin, and effluent conduit means extending from the bottom of the filter basin.

14. A liquid treatment plant comprising, in combination, an outer wall defining an enclosure, an interior wall spaced inwardly thereof and defining within it a filter basin, and defining between itself and the outer wall an annular space, walls extending transversely of such annular space to divide it into a coagulating basin and a sedimentation basin, means to deliver raw water to the coagulating basin, means to regulate flow circularly from the coagulating basin to the sedimentation basin, a weir governing discharge from the sedimentation basin, a flume carried upon the top of the interior wall, and communicating flumes leading inwardly therefrom and discharging at their inner ends within the top of the filter basin, filtering means in the filter basin, effluent conduit means extending from the bottom of the filter basin, beneath the filtering means, means to discharge wash water within the bottom of the filter basin, below the filtering means and wash water drain means including drain channels disposed above the level of filtering means within the filter basin, but below the level of said flumes.

15. A liquid treatment plant comprising, in combination, an outer wall, a horizontal partition dividing the space within said wall into an upper water treatment space and a lower water storage space, means dividing the upper space to define a pipe vault and a filter basin surrounding the same, means to deliver raw water to the filter basin, filtering means in the filter basin, a conduit to discharge filter effluent from the bottom of the filter basin through the horizontal partition into the lower space, means, including a conduit extending through the pipe vault, to draw wash water through the horizontal partition from the lower space, and to discharge such wash water into the bottom of the filter basin, a drain channel within the upper part of the filter basin, a vertical drain within the pipe vault and extending downwardly through the water storage space, receiving wash water from said drain channel, and means in the pipe vault to control flow of effluent from and wash water to and from the filter basin.

16. In a liquid clarification plant, the combination of a series of walls and partitions defining coagulating, sedimentation and filter basins, the whole arranged in circular plan, and a centrally disposed control house, the several basins being arranged with the filter basin inside of and surrounded by the coagulating and sedimentation basins, the walls and partitions further defining a plurality of independent filter chambers occupying the filter basin, filtering means in each filter chamber, means to conduct raw water directly from the exterior of the plant to said coagulating basin, means consisting solely of weirs and open channels to conduct the water successively from the coagulating basin across such a partition to the sedimentation basin, and thence across such a partition to the filter basin and to the several filter beds by way of the central control house, without in any instance traversing any other of said basins or partitions, means located at the control house for controlling flow to individual filter beds, and effluent conduit means leading from the filter basin.

17. A liquid treatment plant comprising, in combination, a series of walls and partitions defining coagulating, sedimentation, and filter basins, and a pipe vault, the whole arranged in circular plan, with the coagulating basin at the periphery, the filter basins surrounded by the other basins, and the pipe vault centrally disposed, filters in the filter basins, means to conduct raw water directly to said peripherally disposed coagulating basin, means to conduct water from the surface of the coagulating basin to the sedimentation basin, and from the surface of the sedimentation basin to the filter basins, in each instance without traversing other basins nor entering the pipe vault, effluent pipes leading from the filter basins, means in the pipe vault to govern flow through said effluent pipes, a wash water supply conduit extending through the pipe vault and thence to the filter basins without traversing other basins, and wash water drainage collecting means located within the pipe vault, means for connecting said collecting means directly with the adjoining filter basin, and a drain leading from said collecting means outwardly beyond the periphery of the plant, said drain constituting the sole conduit which traverses a basin other than that into which it discharges.

18. A liquid treatment plant comprising, in combination, an outer wall defining an enclosure, interior walls dividing such enclosure into a central pipe vault, an annular filter basin next outwardly of and surrounding the pipe vault, and an annular outer water treatment space surrounding the filter basin, generally radially disposed walls dividing the filter basin into a plurality of independent filter beds, means to deliver raw water to the outer water treatment space, means consisting of surface flow weirs and channels extending along the top of said radial walls to lead the water from the water treatment space to the interior wall which divides the filter basin from the pipe vault, means there located to control the flow to the individual filter beds, and effluent conduit means leading from the bottom of the several filter beds.

19. A liquid treatment plant comprising, in combination, an outer wall defining an enclosure, interior walls dividing such enclosure into a central pipe vault, an annular filter basin next outwardly of and surrounding the pipe vault, and an annular outer water treatment space surrounding the filter basin, generally radially disposed walls dividing the filter basin into a plurality of independent filter beds, means to deliver raw water to the outer water treatment space, means consisting of surface flow weirs and channels extending along the top of said radial walls to lead the water from the water treatment space to the interior wall which divides the filter basin from the pipe vault, means there located to control the flow to the individual filter beds, effluent conduit means leading from the bottom of the several filter beds, and effluent flow control means operable from within the pipe vault for each of the several filter beds.

20. In a liquid clarification plant of generally circular plan form, in combination, circumferentially disposed coagulating and sedimentation basins, a filter basin surrounded by the coagulating and sedimentation basins, a partition wall between each coagulating basin and each sedimentation basin, formed as a weir and constituting the sole outlet from such coagulating basin to the corresponding sedimentation basin, a similar partition wall between each sedimentation basin and the inwardly disposed filter basin, likewise formed as a weir and constituting the sole outlet from such sedimentation basin to the filter basin, means to conduct raw water from the exterior directly to the coagulating basins, to traverse in succession a coagulating basin, a corresponding sedimentation basin, and the filter basin, without in any instance traversing any other of said basins, means in the filter basin to filter out solids, and effluent pipes leading from the filter basin.

21. A liquid clarification plant comprising an outer and a first inner wall generally concentrically disposed, defining, between them, a coagulating basin and a sedimentation basin, a radial partition wall separating the two basins and formed as a weir only over which water may pass from the coagulating basin directly to the sedimentation basin, a second inner wall within and concentric to the first inner wall, defining between them a filter basin, the first inner wall, at the outlet end of the sedimentation basin, being formed as a weir only over which water may pass from the sedimentation basin directly to the filter basin, the second inner wall defining, within it, a pipe vault, means to conduct raw water from the exterior past the outer wall only, and directly to the coagulating basin, means in the filter basin to filter out solids from the water as it passes therethrough, and an effluent pipe leading from the filter basin.

22. A liquid clarification plant comprising an outer and a first inner wall generally concentrically disposed, defining, between them, a coagulating basin and a sedimentation basin, a radial partition wall separating the two basins and forming a weir only over which water may pass from the coagulating basin directly to the sedimentation basin, a second inner wall within and concentric to the first inner wall, defining between them a filter basin, the first inner wall, at the outlet end of the sedimentation basin, being formed as a weir only over which water may pass from the sedimentation basin directly to the filter basin, the second inner wall defining, within it, a pipe vault, means to conduct raw water from the exterior past the outer wall only, and directly to the coagulating basin, means in the filter basin to filter out solids from the water as it passes therethrough, a clear well underlying the space beneath the plant as thus constituted, an effluent pipe leading from the filter basin to the clear well through the pipe vault, and flow control means in the pipe vault.

23. A liquid treatment plant comprising, in combination, contiguous coagulating, sedimentation, and filter basins, and a pipe vault, arranged generally concentrically, with the coagulating basin at the periphery, the filter basin surrounded by the other basins, and the pipe vault at the center, filters in the filter basin, means to conduct raw water directly from the exterior to the coagulating basin, means governing flow from the coagulating basin to the sedimentation basin, and from the sedimentation basin to the filter basin, in each instance without traversing other basins nor entering the pipe vault, effluent conduit means leading from the filter basin, wash water conduit means leading to the filter basin, and means within the pipe vault controlling flow through said two conduit means, to conduct clear water from and to the filter basin, by way of the pipe vault, without, in either instance, traversing other basins.

WILLIAM R. GIBSON.